(12) United States Patent
Meredith et al.

(10) Patent No.: US 10,277,709 B2
(45) Date of Patent: Apr. 30, 2019

(54) DETERMINING A VISITATION PROFILE FOR A USER

(71) Applicant: AT&T Mobility II LLC, Atlanta, GA (US)

(72) Inventors: Sheldon Kent Meredith, Marietta, GA (US); John Pastore, Suwanee, GA (US); Rick Tipton, Corryton, TN (US)

(73) Assignee: AT&T Mobility II LLC, Atlanta, GA (US)

( * ) Notice: Subject to any disclaimer, the term of this patent is extended or adjusted under 35 U.S.C. 154(b) by 439 days.

(21) Appl. No.: 14/531,781

(22) Filed: Nov. 3, 2014

(65) Prior Publication Data

US 2016/0127499 A1    May 5, 2016

(51) Int. Cl.
*H04L 29/08* (2006.01)
*G06F 17/30* (2006.01)

(52) U.S. Cl.
CPC ...... *H04L 67/306* (2013.01); *G06F 17/30887* (2013.01); *H04L 67/02* (2013.01); *H04L 67/04* (2013.01); *H04L 67/14* (2013.01); *H04L 67/22* (2013.01); *H04L 67/2833* (2013.01)

(58) Field of Classification Search
CPC ....... H04L 67/306; H04L 67/02; H04L 67/22; G06F 17/30887
See application file for complete search history.

(56) References Cited

U.S. PATENT DOCUMENTS

| | | | |
|---|---|---|---|
| 7,886,047 B1 | 2/2011 | Potluri | |
| 7,925,743 B2 | 4/2011 | Neely et al. | |
| 8,175,989 B1 * | 5/2012 | Gopinath | G06N 7/005 706/45 |
| 8,230,016 B1 * | 7/2012 | Pattan | G06Q 50/01 709/204 |
| 8,265,090 B2 * | 9/2012 | Cai | H04L 67/306 370/352 |
| 8,281,005 B2 | 10/2012 | Vanderhook et al. | |
| 8,539,057 B2 | 9/2013 | Chang et al. | |
| 8,626,913 B1 | 1/2014 | Chourey et al. | |
| 8,666,965 B2 | 3/2014 | Bennett | |
| 8,776,111 B1 * | 7/2014 | Eldering | H04H 60/66 705/14.49 |
| 9,280,789 B2 * | 3/2016 | Kirkham | G06Q 30/0631 |
| 9,691,082 B1 * | 6/2017 | Burnett | G06Q 30/0255 |

(Continued)

OTHER PUBLICATIONS

Jamie Murphy et al., "Website-generated market-research data tracing the tracks left behind by visitors", Cornell Hotel and Restaurant Administration Quarterly vol. 42 Issue1 (Feb. 2001). pp. 82-91.

*Primary Examiner* — Uzma Alam

(57) ABSTRACT

A method, non-transitory computer-readable storage device, and apparatus for determining a visitation profile for a user are disclosed. For example, the method gathers uniform resource locator visitation data from each user endpoint device of a plurality of user endpoint devices associated with the user, aggregates the uniform resource locator visitation data that is gathered from the plurality of user endpoint devices associated with the user, and determines the visitation profile for the user, wherein the visitation profile indicates a trend of the uniform resource locator visitation data over a time period.

20 Claims, 3 Drawing Sheets

(56) References Cited

U.S. PATENT DOCUMENTS

| | | | |
|---|---|---|---|
| 2002/0019771 A1* | 2/2002 | Shuster | G06Q 30/02 |
| | | | 705/14.51 |
| 2002/0083167 A1 | 6/2002 | Costigan et al. | |
| 2008/0281952 A1* | 11/2008 | Fedotenko | H04W 8/183 |
| | | | 709/223 |
| 2009/0063660 A1* | 3/2009 | Fleischman | G11B 27/10 |
| | | | 709/219 |
| 2009/0313086 A1* | 12/2009 | Lee | G06O 30/02 |
| | | | 705/14.53 |
| 2012/0084292 A1* | 4/2012 | Liang | G06F 17/30899 |
| | | | 707/741 |
| 2012/0130819 A1* | 5/2012 | Willcock | G06F 17/30867 |
| | | | 705/14.66 |
| 2012/0158950 A1 | 6/2012 | Seifert et al. | |
| 2012/0166380 A1* | 6/2012 | Sridharan | G06Q 30/02 |
| | | | 706/52 |
| 2012/0254097 A1* | 10/2012 | Flinn | G06N 7/02 |
| | | | 706/52 |
| 2012/0284256 A1* | 11/2012 | Mahajan | G06F 17/3087 |
| | | | 707/722 |
| 2012/0316902 A1* | 12/2012 | Kumar | G06Q 10/00 |
| | | | 705/7.11 |
| 2013/0014040 A1* | 1/2013 | Jagannathan | G06Q 50/01 |
| | | | 715/765 |
| 2013/0080498 A1 | 3/2013 | Desilva et al. | |
| 2013/0246609 A1 | 3/2013 | Topchy et al. | |
| 2013/0304906 A1 | 9/2013 | Yavilevich et al. | |
| 2013/0332267 A1 | 12/2013 | Filev et al. | |
| 2014/0012941 A1* | 1/2014 | Smith | G06Q 30/0205 |
| | | | 709/217 |
| 2014/0024339 A1* | 1/2014 | Dabbiere | H04M 15/885 |
| | | | 455/406 |
| 2014/0032468 A1* | 1/2014 | Anandaraj | G06Q 30/02 |
| | | | 706/46 |
| 2014/0143012 A1 | 5/2014 | Alon et al. | |
| 2014/0149577 A1 | 5/2014 | Monighetti | |
| 2014/0364110 A1* | 12/2014 | Rao | H04L 41/0233 |
| | | | 455/419 |
| 2014/0364157 A1* | 12/2014 | Baddeley | H04W 4/12 |
| | | | 455/466 |
| 2015/0039980 A1* | 2/2015 | Gonzalez | H04L 67/02 |
| | | | 715/205 |
| 2015/0195374 A1* | 7/2015 | Wang | H04L 65/601 |
| | | | 709/219 |

\* cited by examiner

DETERMINING A VISITATION PROFILE FOR A USER

The present disclosure relates generally to determining a visitation profile, e.g., a uniform resource locator (URL) visitation profile, for a user that accesses services via a wireless and/or wire based networks.

BACKGROUND

A user may access network services and visit various websites via a variety of user endpoint devices. For example, the user may visit any number of URLs via a computing device such as a computer, a mobile device such as a cell phone, a computing tablet, or a smart phone, a smart television, an intelligent vehicle, and the like. It is noted that the user's URL visitation behavior may be different on the various devices that are used to access these URLs. As such, the information gathered solely from the websites visited by the user may not be a good indicator of the general browsing behavior of the user.

SUMMARY OF THE DISCLOSURE

In one embodiment, the present disclosure describes a method, non-transitory computer-readable storage device, and apparatus for determining a visitation profile for a user. For example, the method gathers uniform resource locator visitation data from each user endpoint device of a plurality of user endpoint devices associated with the user, aggregates the uniform resource locator visitation data that is gathered from the plurality of user endpoint devices associated with the user, and determines the visitation profile for the user, wherein the visitation profile indicates a trend of the uniform resource locator visitation data over a time period.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
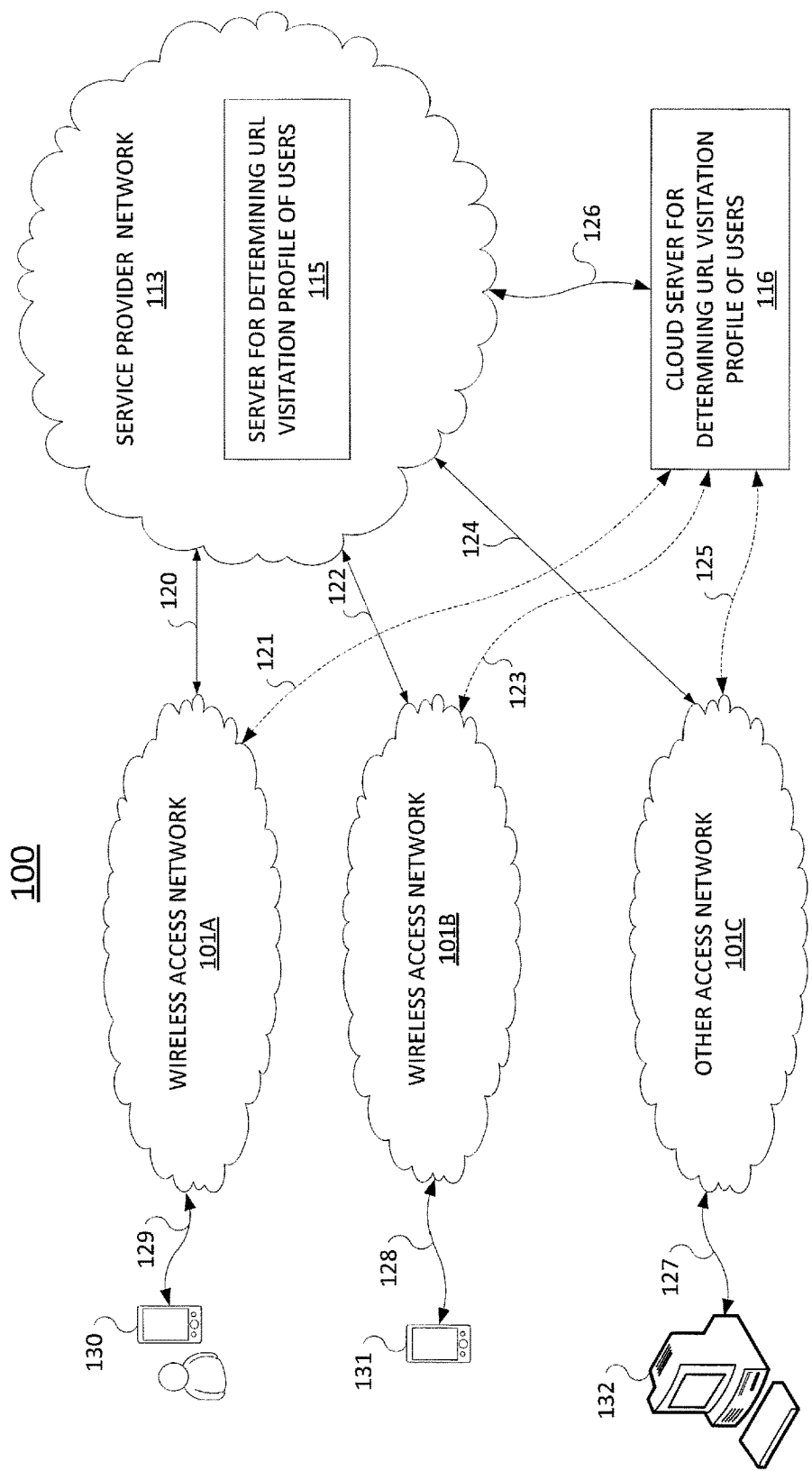
FIG. 1 illustrates an illustrative network related to the present disclosure.

The present disclosure broadly describes a method, non-transitory computer-readable storage device, and apparatus for determining a visitation profile, e.g., a uniform resource locator (URL) visitation profile, for a user. A user may access network services and visit various websites via a plurality of user endpoint devices. One approach to understand the user's browsing behavior is to gather URL visitation data from the various websites visited by the user. However, the user's URL visitation behavior may be different based on the various devices that are used to access these websites. For example, it is likely that the user may access various websites using a variety of devices, e.g., a computing device such as a computer, a mobile device such as a cell phone, a computing tablet, a laptop computer or a smart phone, a smart television, and/or an intelligent vehicle such as a vehicle having wireless communication capability (e.g., with built-in computing and/or web browsing capability), and the like. Hence, the browsing behavior that is based solely on the websites visited by a user, without considering the endpoint devices or the communication channels used by the user may provide an incomplete browsing profile. Consequently, the associated URL visitation profile is incomplete.

For example, a user situated at home may employ a personal computer to visit URLs related to the user's family activities (e.g., social networking websites), and financial activities (e.g., financial institutions like banks and credit card companies). In another example, the same user may not visit these social networking and financial institution websites using a company issued device during work hours. In another example, the user may visit news, weather, and/or traffic related URLs using a mobile device during a commuting time period between the user's home and a work location. In another example, the user may not visit URLs that need password and authentication while being connected to a public Wireless Fidelity (Wi-Fi) network. In other words, the user may behave differently based on the type of connectivity (e.g., a wired communication channel (e.g., a cable network, or a fiber optic network), a wireless communication channel, a particular type of wireless communication channel such as cellular or Wi-Fi, and the like) even though the user may be using the same endpoint device.

Furthermore, in some scenarios it may be difficult to aggregate or attribute the various instances of browsing or sessions to a URL to the same user. For example, a user may use a home computer to look up a product that is stocked by a home improvement store. While at the physical location of the home improvement store, the user may again access the same website of the home improvement store to inquire about a compatible product using a mobile smart phone. Namely, the user may use many different endpoint devices to visit the same URL, but it is not readily apparent to attribute these different visits or communication sessions to the same user.

In one embodiment, the present disclosure determines a visitation profile, e.g., a uniform resource locator (URL) visitation profile, for a user, where the URL visitation profile is a composite URL visitation profile. More specifically, the composite URL visitation profile is based on URL visitation data gathered from a plurality of user endpoint devices associated with the same user. In one embodiment, the plurality of user endpoint devices comprises one of more of: a computing device such as a computer, a mobile device such as a cell phone, a computing tablet, a laptop computer or a smart phone, a smart television, and/or an intelligent vehicle such as a vehicle having wireless communication capability (e.g., with built-in computing and/or web browsing capability), and the like.

The method then enables a server to associate the plurality of user endpoint devices with the user. In one embodiment, the association of user endpoints devices with the user is based on account information of the user. For example, if the user wishes to receive marketing messages and/or offers for products and services, the user may create a profile. For example, the user may create a profile that indicates the user's age, the user's gender, the user's family members, etc. In addition, the user may include in the profile an association between each of user endpoint devices to the user and/or one or more family members of the user, e.g., a phone number of a mobile device, an International Mobile Equipment Identity (IMEI), a mobile identification number (MIN), a mobile subscription identification number (MSIN), a media access control address (MAC address), an Internet Protocol address (IP address) or any other device identifications that can be used to associate a particular device to a particular user. The profile of the user may then be stored at a server or a database of the service provider. The network service provider may then track URL visits that are performed via each of the plurality of user endpoint devices that is registered for the user.

In one embodiment, the association of user endpoint devices with the user is based on an analysis of location information received by the service provider via any number of the plurality of user endpoint devices. For example, the service provider may determine Global Positioning System (GPS) data from the user's vehicle, mobile device, etc. In another example, the association of user endpoint devices with the user may be based on a location of an access network through which the user is accessing connectivity services. For example, the location of the access network may be used to determine whether the user is at a home location, a work location, a school location, a restaurant, a transportation hub, e.g., an airport, a train station, or a bus depot, an entertainment facility such as a movie theater, a stadium or a concert hall, or on a particular road or highway, etc.

The method then gathers URL visitation data from each of the plurality of user endpoint devices associated with the user. In one embodiment, the URL visitation data for a particular user endpoint device associated with the user may comprise uniform resource locator addresses that are visited by the user via each particular user endpoint device, a number of sessions per URL address that is visited, a count of clicks per URL address that is visited, an amount of content (e.g., a count of the number of megabytes of downloaded data) and the type of content (e.g., types of video data such as movies, sports programs, or television shows; audio data such as music, or telephone conversations; product and/or service purchasing data and the like) transferred between the URL being visited and the user endpoint device, etc. The collected URL visitation data can be measured or sorted based on a predefined time period, e.g., every hour, every day, every week, every month, every quarter of a year and so on.

For example, the URL visitation data (broadly a session record) may be collected when visiting a company website, e.g., "companyxyz.com." A visit to the "companyxyz.com" website will open a session. As long as the user continues to be active on the "companyxyz.com" website, e.g., clicking on any links of the "companyxyz.com" website, the session remains open and a timeout timer continues to be reset. Various URL visitation data will be gathered while the session remains open. If the user fails to click on a link of the "companyxyz.com" prior to an expiration of the timeout timer, the session may close. When the session closes, a session record may be created and stored.

In one embodiment, the session record comprises: the URL that is visited, a number of clicks for the session, a start time, a stop time, a size of transferred content (e.g., a number of megabytes of content that is transferred between the user endpoint device and the website being visited), and the like. In one embodiment, the size of transferred content may further be distinguished as content directed towards the user endpoint device (e.g., downloaded content) and content that is directed towards the URL that is being visited (e.g., uploaded content). For example, the size of transferred content may comprise 5 Megabytes of upstream data (towards the URL being visited) and 100 Megabytes of downstream data (towards the user endpoint device). The particular user endpoint device may then send the session record to the server periodically or upon request.

In one embodiment, the method aggregates, for each particular user endpoint device of the user, the URL visitation data that is gathered. For example the URL visitation data may be aggregated over a defined period of time and aggregated for each particular user endpoint device, in order to determine: a number of sessions, a number of clicks, and a size of content that is transferred, per URL that is visited. For instance, the defined period of time may comprise: an extended period of time comprising a plurality of days (e.g., 7 days, 30 days, 90 days, etc.), a portion of a day (e.g., specific time intervals, A.M., P.M., morning and afternoon commute times, business hours, early evening, late evenings, a particular day of a week (e.g., weekdays or weekend days)), and so on.

In another embodiment, the aggregating is performed over a geographical area. For example, the service provider may wish to know whether the URL visitation profile indicates that the URL visitation data of the particular user varies based on the location of the user. For example, the URL visitation may be different while the user is in a business location, e.g., inside a physical store of a merchant, in a vacation area, in a city area, in a suburb area, in an area greater than 10 miles from the user's home, in an area greater than 100 miles from the user's home, and so on.

The method then aggregates the URL visitation data that is gathered from the various user endpoint devices. For example, for each URL visited by the user via the various endpoint devices, the method aggregates together a number of sessions, a number of clicks, and a size of content that is transferred. After the aggregation over the various endpoint devices, the aggregated URL visitation data for the user indicates: the URLs visited, the number of sessions, the number of clicks, and the size of content that is transferred. In sum, the aggregated URL visitation data appears as if the URL visitations occurred via a single user endpoint device.

For example, if a user visited in a particular time interval (e.g., during a particular day), the URLs of example companies Abc and Xyz, with the example URLs "companyabc.com" and "companyxyz.com," respectively, via two user endpoint devices comprising a mobile device and a home computer, the aggregated information for the particular day for the user may be as shown in Table 1:

TABLE 1

Aggregated information for an example user

| URLs | Devices | No. of Sessions | No. of Clicks | Size of content transferred (e.g., in Megabytes) |
|---|---|---|---|---|
| Companyabc.com | Mobile device | 1 | 5 | 5 |
|  | Home computer | 2 | 100 | 25 |
|  | Total | 3 | 105 | 30 |
| Companyxyz.com | Mobile device | 6 | 20 | 100 |
|  | Home computer | 3 | 3 | 5 |
|  | Total | 9 | 23 | 105 |

It should be noted that the numerical values, types of parameters of interest (e.g., the number of clicks or the size of the transferred content), URLs, types of devices, in Table 1 are only for illustration purposes and are not intended to limit the scope of the present disclosure. It should be noted that the URLs, types of devices, and the parameters of interest that are tracked or aggregated are in accordance with the needs of the service provider or the requirements of a particular deployment of the present disclosure. For example, if the tracked data is for marketing purposes, the types of content accessed at each URL (e.g., types of goods and services purchased at each URL, goods and services being offered at each URL, coupons used in making the purchases, items viewed but not purchased, etc.), may also be recorded, aggregated and tracked over time.

In one embodiment, the method also gathers the type of connectivity for each URL visitation. For example, the service provider may wish to determine whether the user's URL visitation varies based on a type of connectivity. For example, the user may transfer large content when visiting a URL via a computer over a cable network, a fiber optic network, etc. In another example, the user may transfer condensed versions of content while using a mobile device or while connected via a cellular service. In yet another example, the user may wish to limit the content size and type while visiting via a Wi-Fi connection, via a macro-cellular network, etc.

The method may then aggregate the URL visitation data based on a type of connectivity. Another table may then be created for the various types of connectivity, similar to Table 1 created for the various types of user endpoint devices.

The method then determines a URL visitation profile for the user. The URL visitation profile is based on an analysis on the aggregated or composite URL visitation data via all of the plurality of user endpoint devices associated with the user. In one embodiment, the URL visitation profile may indicate a trend of the URL visitation data over a time period. In another embodiment, the URL visitation profile may indicate a trend of the URL visitation data over a type of connectivity. In another embodiment, the URL visitation profile may indicate a trend of the URL visitation data over both a time period, and a type of connectivity. For example, the trend may indicate, while the user is connected via a public Wi-Fi network during evening hours, the user is visiting URLs associated with football games. In another example, the trend may indicate, while the user is connected via a public Wi-Fi network during business hours, the user is visiting URLs associated with stock markets. In yet another example, while the user is connected via a secure Wi-Fi network on weekends, the user is visiting URLs associated with online shops, and so on.

In turn, the method may then provide an offer to the user based the URL visitation profile that is determined. For example, the service provider may sends messages, coupons, service and product offers, etc., based on the URL visitation profile. In one embodiment, the offer that is provided is based on the trend of the URL visitation data over a particular time period. In one embodiment, the offer that is provided is based on the trend of the URL visitation data over the type of connectivity. In one embodiment, the offer that is provided is based on the trend of the URL visitation data over both the type of connectivity and over a particular time period.

In one embodiment, the URL visitation profile may be sold or provided to marketers. For example, the service provider may combine URL visitation profiles of multiple users and sell or provide the combined URL visitation profile to online advertisers.

In one embodiment, the method further categorizes the URL visitation data that is gathered into one or more descriptors. For example, the URL may be for a company that provides one or more services or products. For example, if the URL was for a telecommunication service provider, the descriptor may indicate a cellular phone service provider, a wire based telephone service provider, an Internet access service provider, etc. In another example, if the URL is associated with a home improvement company that provides professional contractors, landscaping, etc., the descriptor may indicate one or more of: a professional contractor, a home improvement company, a tool supplier, a landscaping contractor, and the like. The URL visitation profile may then be refined based on the descriptors. For example, if the URL visitation profiles are being sold or provided by the network service provider to marketers, the recipients of the URL visitation profiles may use the descriptors for matching users with the appropriate offers, coupons and messages.

In one embodiment, the method of the present disclosure may be implemented via a server, e.g., an application server deployed in a service provider network. In another embodiment, the method may be implemented via a cloud server. A cloud server refers to a virtual private server (VPS) that is software defined but operates on a shared physical layer or platform. The cloud server may comprise hardware and/or software resources, e.g., central processing unit, memories, various software applications that are dynamically selected at runtime. For example, the resources of the cloud server may be modified at runtime based on workload. Regardless of the type of implementation, the method of the present disclosure exploits the connectivity between the server and any number of the user endpoint devices. The server, regardless of its location, then associates the user with each of the user endpoint devices, gathers URL visitation data from each of the user endpoint devices, aggregates the data that is gathered, and generates the composite URL visitation profile.

FIG. 1 illustrates an exemplary network 100 related to the present disclosure. In one illustrative embodiment, the network 100 comprises wireless access networks 101a and 101b, other access network 101c, and a core service provider network 113 (or broadly a core network). The wireless networks 101a and 101b may comprise any number of wireless access networks, e.g., Wi-Fi networks, 2G networks, 3G networks, LTE networks, satellite network, etc.

The core network 113 may comprise any number of application servers, gateway devices, routers, switches, databases, etc. of a network service provider. For example, the core network 113 may comprise an application server 115 for determining the URL visitation profiles of users. The core network 113 may also be communicatively coupled to one or more cloud servers 116. The method of the present disclosure may be implemented in a server of a service provider network, e.g., server 115, or a cloud server, e.g., server 116, of the present disclosure. The access networks 101a-101c communicate with application servers 115 and/or 116 via various types of transmission media 120-126.

Although the teachings of the present disclosure are discussed below in the context of a core network, the teaching is not so limited. Namely, the teachings of the present disclosure can be applied in any types of wireless networks (e.g., 2G network, 3G network, a long term evolution (LTE) network, and the like) or any types of wire based networks (e.g., public switched telephone network, Internet Protocol (IP) networks, cable networks, etc.), wherein determining the uniform resource locator (URL) visitation profile of a user, is beneficial.

FIG. 1 also illustrates various user endpoint devices 130-132. The user endpoint devices 130-131 access services via a wireless access network 101a or 101b via various types of transmission media 128-129. The user endpoint device 132 accesses services via the other access network 101c (e.g., a fiber optic network, a cable network, etc.) via various types of transmission media 127. It should be noted that the network 100 is only illustrative and the number of network components or elements are not specifically limited as shown. Any number of network elements and components can be deployed. For example, there may be several wireless networks, several wire based access networks, several different core networks, several cloud servers, and the like. In addition, any number of network elements may be deployed in each of the networks.

Figure 2:
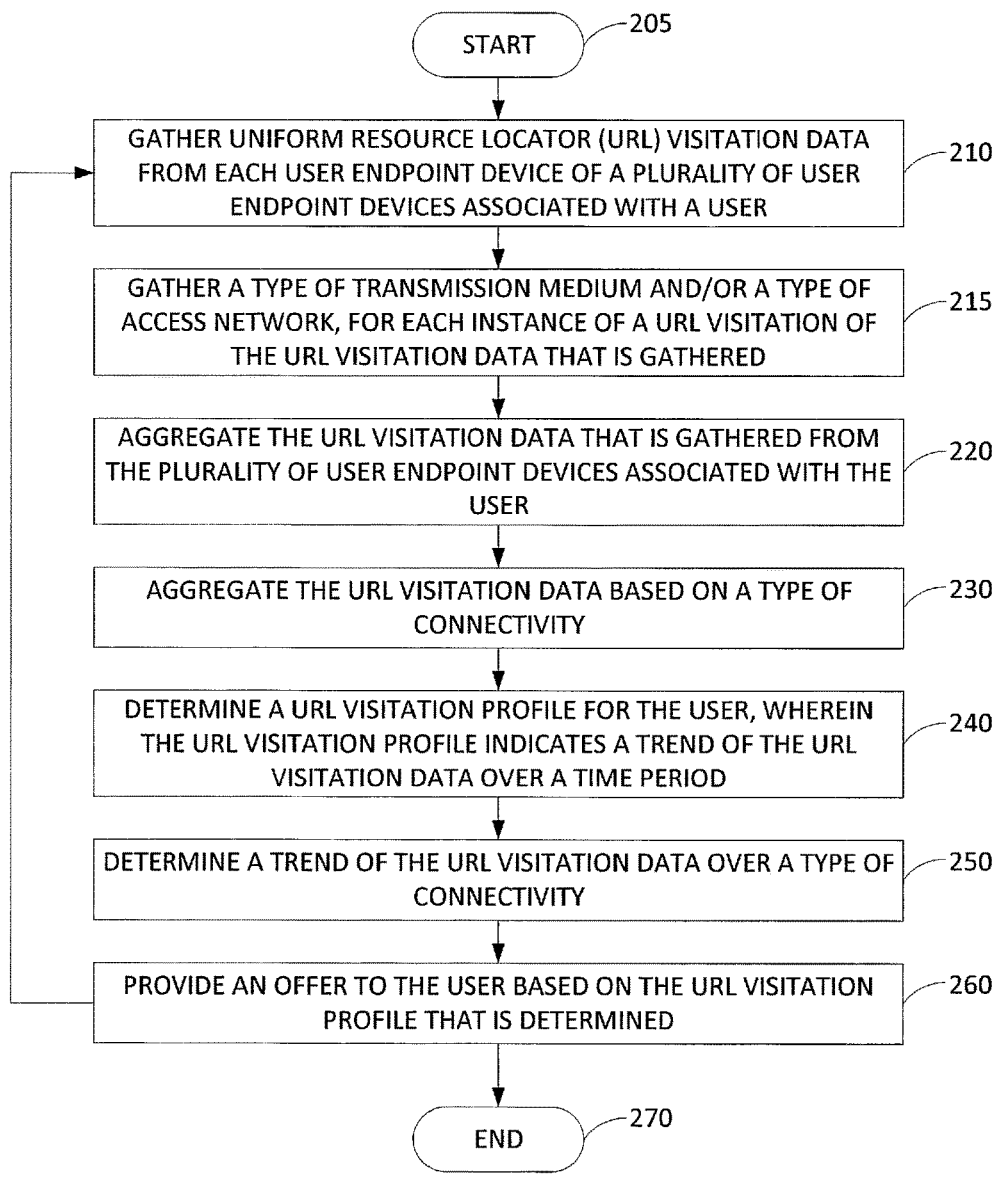
FIG. 2 illustrates a method of the present disclosure for determining a uniform resource locator visitation profile for a user.

FIG. 2 illustrates a flowchart of a method 200 of the present disclosure for determining a uniform resource locator (URL) visitation profile for a user. For example, the method may be implemented in a server, e.g., an application server of a service provider, a cloud server, etc. Method 200 starts in step 205 and proceeds to step 210.

In step 210, method 200 gathers URL visitation data from each user endpoint device of a plurality of user endpoint devices associated with the user. For example, the method may gather URL visitation data for each particular user endpoint device that comprises: uniform resource locator addresses that are visited by the user via the particular user endpoint device, a number of sessions per URL address that is visited, a count of clicks per URL address that is visited, amount of content transferred between the URL being visited and the type of user endpoint device.

In optional step 215, method 200 gathers a type of connectivity, for each instance of a URL visitation of the URL visitation data that is gathered. For example, for each instance of a URL visitation data that is gathered in step 210, the method may gather the type of connectivity used for that particular instance.

In step 220, method 200 aggregates the URL visitation data that is gathered from the plurality of user endpoint devices associated with the user. For example, the method may aggregate, for each particular user endpoint device of the plurality of endpoint devices, the URL visitation data that is gathered over a period of time. The method may then aggregate the URL visitation data over all of the plurality of user endpoint devices associated with the user.

In optional step 230, method 200 also aggregates the URL visitation data based on a type of connectivity. For example, the method may aggregate for each user endpoint device of the plurality of endpoint devices, URLs visited, types of connectivity associated with each visit, size of content transferred between the URL being visited and the user endpoint device. The method may then aggregate the URL visitation data over all of the plurality of user endpoint devices associated with the user. In other words, correlating the type of connectivity to the URL visitation data provides an additional insight into the user's behavior in accessing each URL.

In step 240, method 200 determines the URL visitation profile for the user, wherein the URL visitation profile indicates a trend of the URL visitation data over a time period. For example, the method performs an analysis on the URL visitation data to determine a trend over a predetermined time period, e.g., over a week, a month, and so on.

In optional step 250, method 200 further determines a trend of the URL visitation data over a type of connectivity.

In optional step 260, method 200 provides an offer to the user based on the URL visitation profile that is determined. For example, the service provider may sends messages, coupons, service and product offers, etc., based on the trend of the URL visitation data over time, or over the type of connectivity. The method then proceeds to step 210 to continue gathering URL visitation data or to step 270 to end processing the present determination of the URL visitation profile for a user.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

As such, the present disclosure provides at least one advancement in the technical field of determining a URL visitation profile of a user. This advancement is in addition to the traditional use of profiles that may be built based on URL visitation profiles that are not aggregated over a plurality of user endpoint devices. Viewed in another manner, the present disclosure provides a URL visitation profile that is based on composite URL visitation data that is gathered for various user endpoint devices of the user. The resulting URL visitation profile can provide users with a unique opportunity to receive marketing offers that are based on their URL visitation profile that takes into account variations of user behavior over various user devices, as well as variations of user behavior based on a type of connectivity.

The present disclosure also provides a transformation of connectivity data. For example, data relating to connectivity is transformed into data that can be used to determine a trend of URL visitation.

Finally, embodiments of the present disclosure improve the functioning of a computing device, e.g., a server. Namely, a server for providing marketing offers is improved by utilizing the URL visitation profile to provide more focused or relevant marketing.

Figure 3:
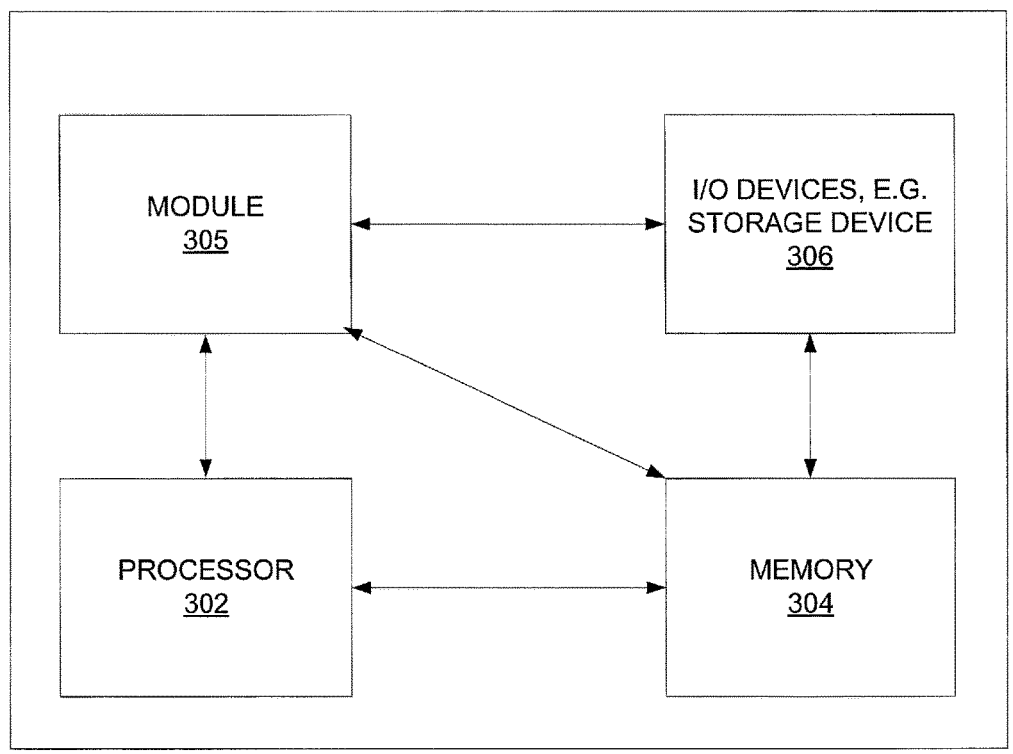
FIG. 3 depicts a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for determining a uniform resource locator visitation profile for a user, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method 200 as discussed above is implemented in a distributed or parallel manner for a particular illustrative example, i.e., the steps of the above method 200, or the entire method 200 is implemented across multiple or parallel general-purpose computers, then the general-purpose computer of this figure is intended to represent each of those multiple general-purpose computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method. In one embodiment, instructions and data for the present module or process 305 for determining a uniform resource locator visitation profile for a user (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for determining a uniform resource locator visitation profile for a user (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for determining a visitation profile for a user, the method comprising:
   gathering, by a processor of a network service provider network, uniform resource locator visitation data from each user endpoint device of a plurality of user endpoint devices associated with the user;
   gathering, by the processor, a type of connectivity for each instance of a uniform resource locator visitation of the uniform resource locator visitation data that is gathered, wherein the type of connectivity for each instance of the uniform resource locator visitation comprises one of: a wired communication channel or a wireless communication channel;
   aggregating, by the processor, the uniform resource locator visitation data that is gathered from the plurality of user endpoint devices associated with the user;
   aggregating, by the processor, the uniform resource locator visitation data based on the type of connectivity that is gathered together with a size of content transferred to each user endpoint device of the plurality of user endpoint devices;
   determining, by the processor, the visitation profile for the user, wherein the visitation profile indicates a trend of the uniform resource locator visitation data over a time period, wherein the trend comprises a trend of the uniform resource locator visitation data over the type of connectivity, wherein the trend is derived from the uniform resource locator visitation data that is aggregated based on the type of connectivity together with the size of content transferred to each user endpoint device, wherein the trend comprises a type of content accessed for a plurality of uniform resource locator visitations of the uniform resource locator visitation data; and
   providing, by the processor, an offer to the user based on the visitation profile that is determined.

2. The method of claim 1, wherein the uniform resource locator visitation data that is gathered from each user endpoint device of the plurality of user endpoint devices comprises at least one of: a uniform resource locator address that is visited, a number of sessions for the uniform resource locator address that is visited, a count of clicks for the uniform resource locator address that is visited, and a size of content transferred between the uniform resource locator address that is visited and each user endpoint device.

3. The method of claim 1, wherein the aggregating is performed over a predetermined period of time.

4. The method of claim 1, further comprising:
   providing, by the processor, the visitation profile that is determined to a marketer.

5. The method of claim 1, further comprising:
associating, by the processor, each user endpoint device of the plurality of user endpoint devices with the user.

6. The method of claim 5, wherein the associating each user endpoint device of the plurality of user endpoint devices with the user is based on account information of the user.

7. The method of claim 6, wherein the account information of the user is based on a profile of the user.

8. The method of claim 5, wherein the associating each user endpoint device of the plurality of user endpoint devices with the user is based on an analysis of location information received via each user endpoint device.

9. The method of claim 8, wherein the location information comprises information received via a global positioning system of each user endpoint device.

10. A tangible computer-readable storage device storing a plurality of instructions which, when executed by a processor of a network service provider network, cause the processor to perform operations for determining a visitation profile for a user, the operations comprising:
gathering uniform resource locator visitation data from each user endpoint device of a plurality of user endpoint devices associated with the user;
gathering a type of connectivity for each instance of a uniform resource locator visitation of the uniform resource locator visitation data that is gathered, wherein the type of connectivity for each instance of the uniform resource locator visitation comprises one of: a wired communication channel or a wireless communication channel;
aggregating the uniform resource locator visitation data that is gathered from the plurality of user endpoint devices associated with the user;
aggregating the uniform resource locator visitation data based on the type of connectivity that is gathered together with a size of content transferred to each user endpoint device of the plurality of user endpoint devices;
determining the visitation profile for the user, wherein the visitation profile indicates a trend of the uniform resource locator visitation data over a time period, wherein the trend comprises a trend of the uniform resource locator visitation data over the type of connectivity, wherein the trend is derived from the uniform resource locator visitation data that is aggregated based on the type of connectivity together with the size of content transferred to each user endpoint device, wherein the trend comprises a type of content accessed for a plurality of uniform resource locator visitations of the uniform resource locator visitation data; and
providing an offer to the user based on the visitation profile that is determined.

11. The tangible computer-readable storage device of claim 10, wherein the uniform resource locator visitation data that is gathered from each user endpoint device of the plurality of user endpoint devices comprises at least one of: a uniform resource locator address that is visited, a number of sessions for the uniform resource locator address that is visited, a count of clicks for the uniform resource locator address that is visited, and a size of content transferred between the uniform resource locator address that is visited and each user endpoint device.

12. The tangible computer-readable storage device of claim 10, the operations further comprising:
providing the visitation profile that is determined to a marketer.

13. An apparatus for determining a visitation profile for a user, the apparatus comprising:
a processor; and
a computer-readable storage device storing a plurality of instructions which, when executed by the processor deployed in a network service provider network, cause the processor to perform operations, the operations comprising:
gathering uniform resource locator visitation data from each user endpoint device of a plurality of user endpoint devices associated with the user;
gathering a type of connectivity for each instance of a uniform resource locator visitation of the uniform resource locator visitation data that is gathered, wherein the type of connectivity for each instance of the uniform resource locator visitation comprises one of: a wired communication channel or a wireless communication channel;
aggregating the uniform resource locator visitation data that is gathered from the plurality of user endpoint devices associated with the user;
aggregating the uniform resource locator visitation data based on the type of connectivity that is gathered together with a size of content transferred to each user endpoint device of the plurality of user endpoint devices;
determining the visitation profile for the user, wherein the visitation profile indicates a trend of the uniform resource locator visitation data over a time period, wherein the trend comprises a trend of the uniform resource locator visitation data over the type of connectivity, wherein the trend is derived from the uniform resource locator visitation data that is aggregated based on the type of connectivity together with the size of content transferred to each user endpoint device, wherein the trend comprises a type of content accessed for a plurality of uniform resource locator visitations of the uniform resource locator visitation data; and
providing an offer to the user based on the visitation profile that is determined.

14. The apparatus of claim 13, wherein the uniform resource locator visitation data that is gathered from each user endpoint device of the plurality of user endpoint devices comprises at least one of: a uniform resource locator address that is visited, a number of sessions for the uniform resource locator address that is visited, a count of clicks for the uniform resource locator address that is visited, and a size of content transferred between the uniform resource locator address that is visited and each user endpoint device.

15. The apparatus of claim 13, wherein the aggregating is performed over a predetermined period of time.

16. The apparatus of claim 13, the operations further comprising:
providing the visitation profile that is determined to a marketer.

17. The apparatus of claim 13, the operations further comprising:
associating each user endpoint device of the plurality of user endpoint devices with the user.

18. The apparatus of claim 17, wherein the associating each user endpoint device of the plurality of user endpoint devices with the user is based on account information of the user.

19. The apparatus of claim 18, wherein the account information of the user is based on a profile of the user.

20. The apparatus of claim 17, wherein the associating each user endpoint device of the plurality of user endpoint devices with the user is based on an analysis of location information received via each user endpoint device.

* * * * *